Sept. 20, 1932.   C. C. BRADBURY   1,878,101
RECTIFIER CIRCUIT
Filed April 29, 1927

Inventor:
Clifford C. Bradbury.
By: Williams, Bradbury, McCaleb & Hinkle
Atty's.

Patented Sept. 20, 1932

1,878,101

UNITED STATES PATENT OFFICE

CLIFFORD C. BRADBURY, OF GLENCOE, ILLINOIS, ASSIGNOR TO FANSTEEL PRODUCTS COMPANY, INC., OF NORTH CHICAGO, ILLINOIS, A CORPORATION OF NEW YORK

RECTIFIER CIRCUIT

Application filed April 29, 1927. Serial No. 187,506.

My invention relates to rectifier circuits and more particularly to means for rectifying and filtering current for use in radio receiving sets.

The object of my invention is to provide a filter circuit wherein one inductance unit serves also as a relay coil.

A further object of my invention is to provide means for automatically disconnecting the electrolytic cells when the load current ceases.

A further object is to provide a relay for a filter circuit, which relay is operated by the rectified current and is not actuated by current from electrolytic cells.

Other objects will be apparent as the detailed description of my invention proceeds.

Figure 1:
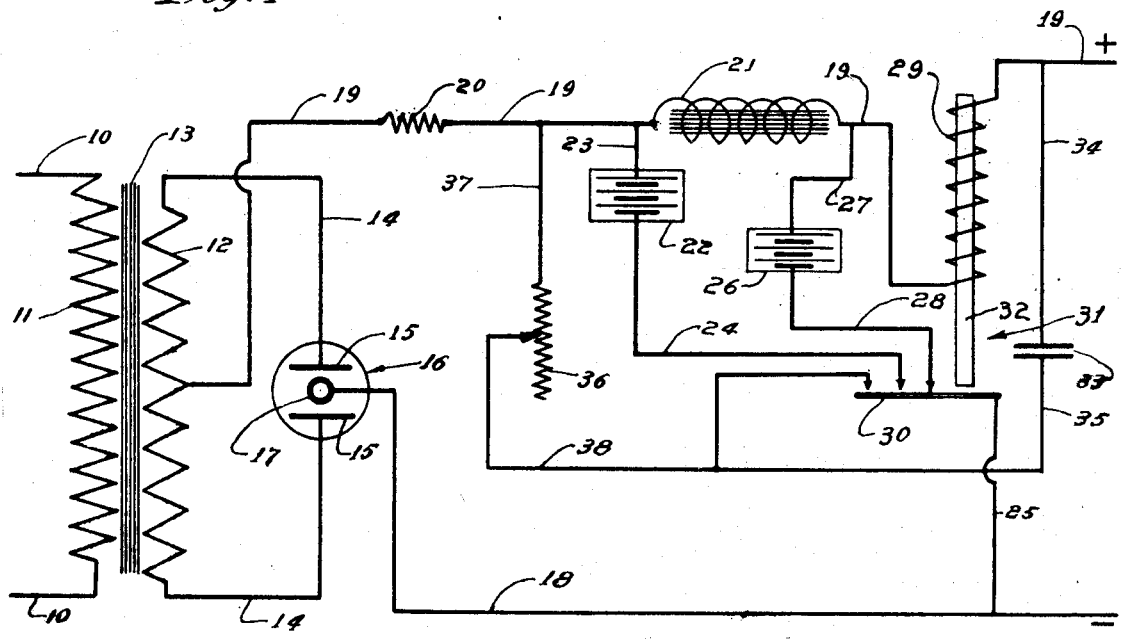
Figure 2:
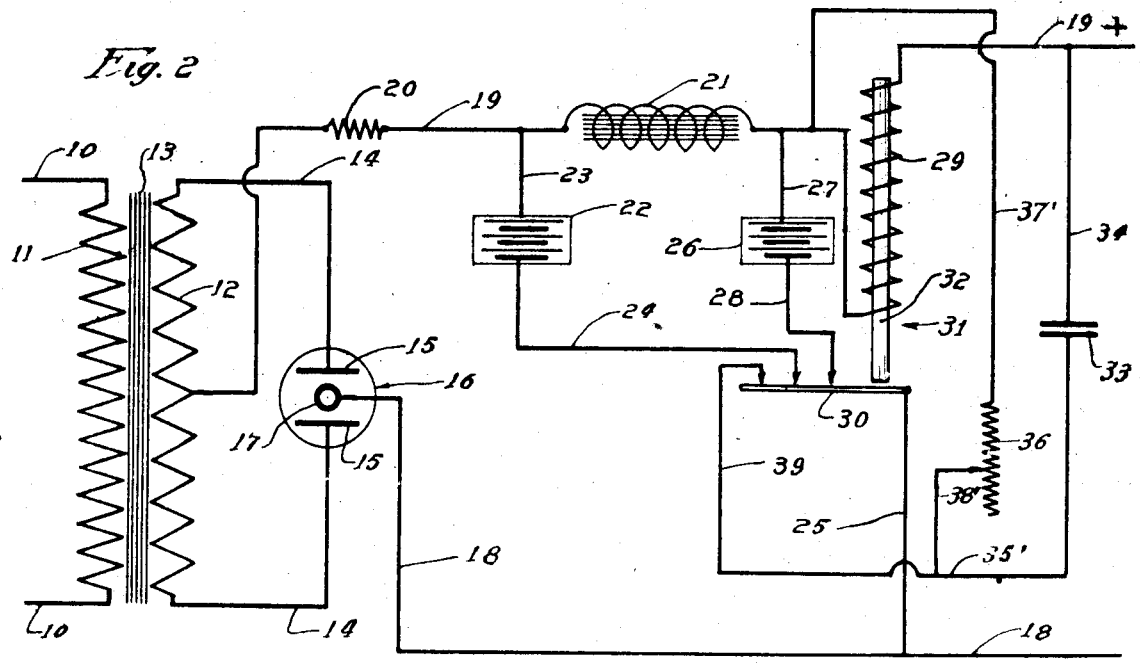

The improved embodiments of my invention are illustrated in the accompanying drawing, in which:

Figure 1 represents diagrammatically the wiring of my improved rectifier and filter circuit, and Figure 2 is a similar diagram showing a slightly different arrangement of the resistance unit.

The alternating current rectifiers of all types are characterized by the fact that they give a pulsating current which results in a hum when this current source is used for telephone or radio receiving sets. By the use of choke coils bridged by electrolytic cells, preferably storage batteries, and by suitable resistance and condenser units as shown in the drawing, I have been able to substantially eliminate this hum and at the same time maintain a high output. I have also provided a means for automatically disconnecting the storage batteries from the circuit when it is not in use so that they will not be discharged through the resistance or other units of the circuit. When the load is applied this means automatically connects said electrolytic cells, as will be hereinafter explained.

A feature of the invention is the fact that the relay does not depend for operating current on the electrolytic cells, but is actuated by the direct current from the rectifier.

Conductors 10 are secured in any suitable manner to an ordinary 110 volt electric lighting circuit and to the terminals of the primary coil 11 of step-down transformer 13, the secondary coil 12 of which is wound on the same core and is proportioned to give an alternating potential of about 50 volts. The terminals of the secondary 12 are connected by conductors 14 to the tantalum electrodes 15 of the double half-wave rectifier 16.

The electrolytic rectifier is preferably composed of suitable acid-proof receptacle containing a sulphuric acid electrolyte (specific gravity 1.200), to which has been added a small amount of salt of a metal of the iron group. In the electrolyte are immersed two tantalum electrodes 15 and a lead electrode 17 which is connected by conductor 18 to the negative terminal of the load. The secondary coil 12 is tapped at the center and a conductor 19 is secured thereto, which conductor is connected to the positive terminal of the load.

The conductor 19 is provided with a ballast coil 20 which is preferably of iron or nickel. The purpose of this ballast is to maintain a constant current flow in conductor 19, the resistance of the ballast increasing with an increased flow.

An inductance 21 is provided in the form of a conventional choke coil, the purpose of which is to oppose any voltage change or pulsating effect in the rectified current.

An electrolytic cell, preferably a storage battery, 22, is bridged across conductors 19 and 18 between inductance 21 and the rectifier 16. The positive pole of the storage battery 22 is connected to conductor 19 by a wire 23 and the negative terminal of this storage battery is connected by a wire 24 through a relay switch 30 and a wire 25 to the negative conductor 18.

On the other side of the inductance 21 an electrolytic cell 26 is bridged across the conductors in the same manner, i. e. positive poles connected by wire 27 to conductor 19 and the negative terminal by a wire 28 through relay switch 30 and wire 25 to the negative conductor 18.

An inductance 29 is arranged after battery 26 and it serves the double function of operating the relay 31 and providing additional filter means for the pulsating current. The relay is provided with a core 32 which actuates the switch 30 to connect or disconnect the electrolytic cells responsive to the current flowing in the conductors.

Between inductance 29 and the load the condenser 33 is bridged across the conductors, being connected to conductor 19 by a wire 34 and to conductor 18 by wires 35 and 25 through switch 30.

The resistance 36 is preferably interposed between ballast coil 20 and storage battery 22 as shown in Figure 1. This unit is preferably a variable resistance of about 30 ohms and is connected by a wire 37 to conductor 19 and by wire 38 through switch 30 and wire 25 to conductor 18.

The modification shown in Figure 2 is the same as that above described except that the resistance is bridged across the conductors between inductance 21 and inductance 29. In this case the wire 38' is joined to wire 35' from condenser 33 and both of these wires are connected to a single pole of switch 30 by conductor 39.

The operation of my invention may be described as follows:

The rectifying means provides a pulsating current which utilizes both half-waves of the current and, as such means are well known in the art, their action will not be described in detail at this point.

The conductors 19 and 18 are connected to the filament of an electronic valve or to a number of such filaments connected in parallel. When a current is set up in conductor 19, the core 32 will be actuated to close switch 30 and connect the electrolytic cells and the resistance with the negative conductor 18.

The function of the ballast coil 20 has been explained. The function of the resistance unit 36 is to provide means for regulating the current and the voltage imposed on the load filaments. When a battery is used for filament supply current the voltage remains practically constant when the current varies but when a rectifying system is employed the voltage drops materially with an increasing filament current.

In order that current at sufficient voltage may be supplied at all times, I have designed my circuit to give the maximum current which may be required. When a lesser current is required the resistance 36 is decreased, thus permitting the current to flow through this path whereby the voltage equilibrium is maintained.

The function of the storage batteries is well-known and needs no description here. These cells provide a low impedance to the current obstructed by the inductance units. Such current tends to charge the batteries and the charged battery maintains the potential at a given voltage when the fluctuation in the rectified circuit tends to fall below this voltage.

The feature of this invention is the means for disconnecting the electrolytic cells when the load is shut off and connecting them again when the load is applied. If the batteries were allowed to remain connected they would discharge through resistance 36 or one of the batteries would tend to discharge through the other. By the simple expedient above described I have provided means for disconnecting these cells and have designed this means to be responsive to current set up in the load circuit. When the load is turned on the first surge of current through coil 29 actuates the switch and connects the storage cells and the resistance unit in operative relation.

While I have described in detail the particular embodiment of my invention, it is understood that I am not limited to the details shown except as defined by the following claims.

I claim:

1. A filter circuit comprising means for rectifying alternating current to direct pulsating current, conductors from said means to a load, a choke coil in one of said conductors, electrolytic cells connected across said conductors on each side of said coil, and a relay, which serves the double function of providing an inductance unit when the rectified current is flowing and disconnecting said cells from one of the conductors when the rectified current ceases to flow whereby short circuits through the cells are prevented.

2. A filter circuit comprising means for rectifying alternating current to direct pulsating current, conductors from said means to a load, a choke coil in one of said conductors, a resistance unit bridged across said conductors, electrolytic cells bridged across said conductors, a relay actuated by rectified current in one of said conductors, and a switch actuated by said relay for disconnecting circuits through said cells and said resistance when the load is shut off.

3. In a filter circuit, means for rectifying alternating current to direct current, means for regulating the values of current and voltage in the circuit, means for smoothing out the pulsations and means responsive to rectified current for connecting the two last mentioned means in operative relation to the circuit when a load is applied to said circuit.

4. In combination, a transformer, an electrolytic rectifier comprising one lead and two tantalum electrodes immersed in a sulphuric acid electrolyte, connections from the tantalum electrodes to the ends of the transformer secondary, a positive conductor from the middle of the secondary to a load, a negative conductor from the load to the lead electrode, a ballast coil in one of the conductors, a resistance unit connected across the conductors, a battery of electrolytic cells connected across said conductors, an inductance coil in one of the conductors, a second battery of the electrolytic cells connected across said conductors, a relay the winding of which serves as an inductance unit, a condenser connected across said conductors and switch means operated by said relay for disconnecting said resistance, batteries of cells and condenser from one of said conductors whereby short circuits through the cells are prevented.

In witness whereof, I hereunto subscribe my name this 23rd day of April, 1927.

CLIFFORD C. BRADBURY.